United States Patent Office 3,613,434
Patented Oct. 19, 1971

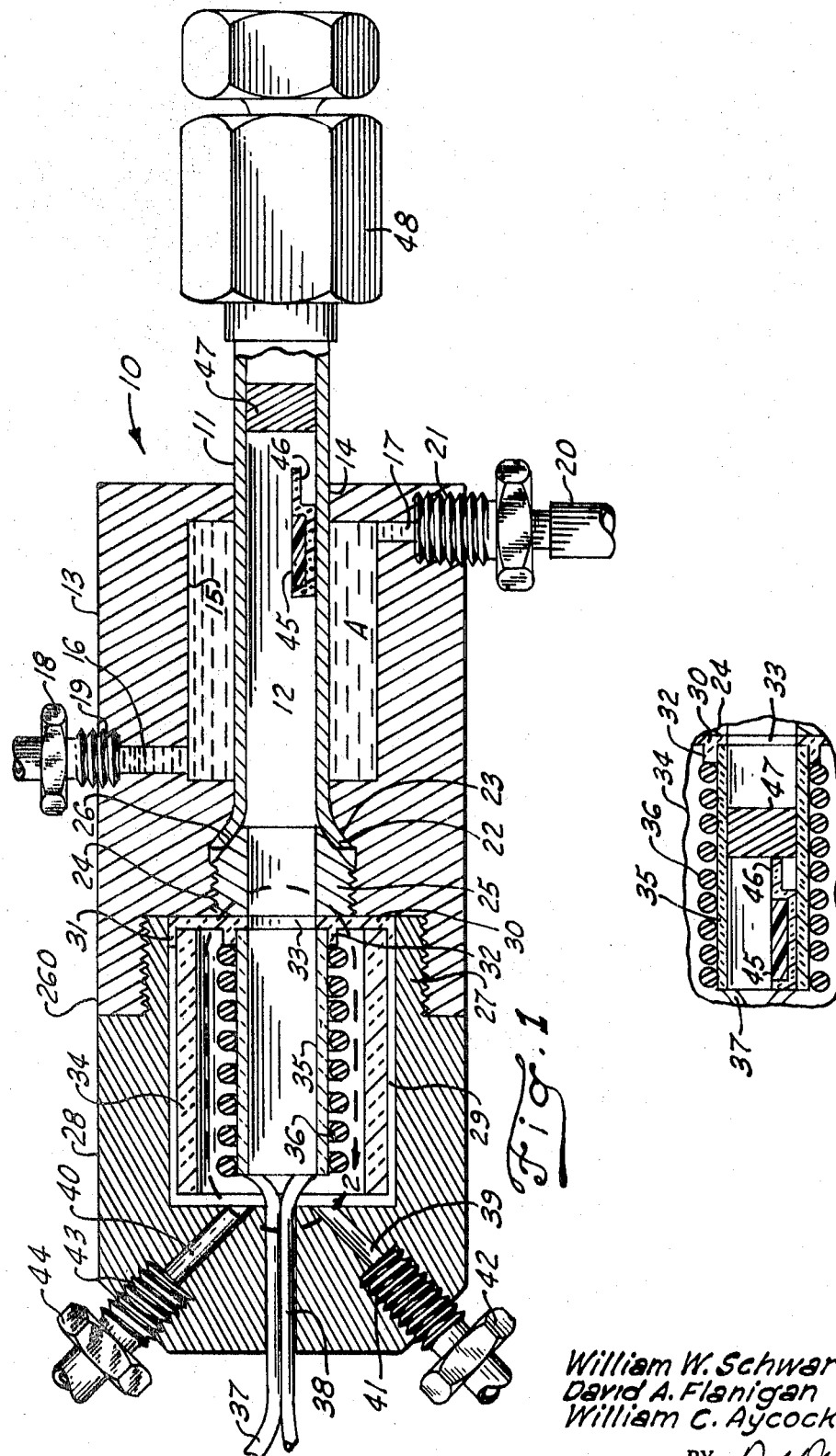
William W. Schwarz
David A. Flanigan  INVENTORS
William C. Aycock

3,613,434
DIFFERENTIAL PRESSURE ANALYZER FOR PROPELLANT INGREDIENTS
William W. Schwarz, Huntsville, David A. Flanigan, Guntersville, and William C. Aycock, Huntsville, Ala., assignors to Thiokol Chemical Corporation, Bristol, Pa.
Filed Aug. 21, 1969, Ser. No. 851,869
Int. Cl. G01n 33/22
U.S. Cl. 73—35                                         4 Claims

ABSTRACT OF THE DISCLOSURE

An apparatus including a heated chamber and a cooled chamber that are connected together in interaxial relation with each other, and having a coaxial passageway therebetween which is gas pressurized, a pressure indicator and a temperature indicator connected to the heated chamber, a micro-combustion boat positioned for free sliding movement within the passageway, a magnetic plug positioned adjacent to the boat so that when a propellant ingredient is placed in the boat, it may be subjected to a cooling temperature and at a predetermined time the plug may be moved under the influence of a magnet to move the boat into a heated atmosphere whereby the decomposition of the propellant ingredient may be achieved under recorded temperature and pressure rises.

BACKGROUND OF THE INVENTION (1) Field of the invention

One of the problems in testing the response of propellant ingredients to heating was the ability to obtain data that would provide the true measurement of the decomposition of the propellant ingredient under operating conditions as they exist in a rocket motor.

The instant invention has been used to successfully obtain such information in a more accurate and realistic manner so that the true rates of decomposition of the propellant ingredients under operating conditions will be obtained.

(2) Description of the prior art

The conventional apparatus currently available include the Differential Scanning Calorimeter (DSC), the Thermal Gravimetric Analyzer (TGA) and the Differential Thermal Analyzer (DTA) that furnish data at relatively low heating rates (<50° C./min.), but there are disadvantages with using these particular apparatus, such as failure to represent the actual physical situations that occur in true combustion processes.

The present invention was, therefore, achieved to overcome the disadvantages that are inherent with currently available apparatus of the foregoing type.

SUMMARY OF THE INVENTION

This invention relates to improvements in differential pressure analyzers that will accurately determine the combustion characteristics of propellant ingredients.

The present invention contemplates the measuring of the decomposition rates of individual propellant ingredients or of mixtures of such ingredients under the influence of high heating rates at various pressures under simulated conditions that represent the operating characteristics of a solid propellant rocket motor.

The apparatus utilizes a pressured chamber that is susceptible of heating as well as cooling a propellant ingredient so that the decomposition rates and results may be obtained under various pressure and temperature rises within the chamber.

An object of the invention is to provide an apparatus that will subject a propellant ingredient to rise in pressure and temperature and obtain data as to the results obtained by such changes in environment.

Another object of the invention is to provide an apparatus including a heating and a cooling chamber in which a propellant ingredient is positioned so that the combustion rates of such propellant ingredient can be properly and accurately determined.

With the above and other objects and advantages in view, as will appear to one skilled in the art from the following description, it is to be understood that the detailed construction of the invention is properly illustrated in the accompanying drawing in which:

BRIEF DESCRIPTION OF THE DRAWING

FIG. 1 is a longitudinal sectional view of an apparatus embodying the invention; and FIG. 2 is a fragmentary sectional view illustrating the movement of the micro-combustion boat within the apparatus and is taken from the area of FIG. 1 enclosed by the dotted ellipse.

DESCRIPTION OF THE PREFERRED EMBODIMENT

Referring more in detail to the drawing wherein like parts are designated by like reference numerals, the reference numeral 10 is generally used to designate a differential pressure analyzer embodying the invention, which is hereinafter referred to as the apparatus 10.

The apparatus 10 comprises a tubular member 11 forming therein a passageway 12 and the tubular member 11 is encompassed by a first cylindrical housing 13 through the medium of a longitudinally extending bore 14, so that the housing 13 is in circumjacent relation to the tubular member 11. Contiguous with the bore 14 is a circular chamber 15 which is filled with water A and the flow of the water A through the chamber 15 is controlled through an outlet 16 and an inlet 17. A pipe coupling 18 is threaded into an internally threaded socket 19 that is in alinement with the outlet 16 and a pipe coupling 20 is threaded into an internally threaded socket 21 that is in alinement with the inlet 17 and the pipe couplings 18 and 20 are connected to an appropriate and conventional water supply and cooling assembly, not shown.

The inner end of the tubular member 11 is flared as at 22 and the inner end of bore 14 is flared at 23 to conform to the flared end 22 of the tubular member 11. The flared portion 23 of the bore 14 continues into an enlarged internally threaded seat 24 which receives a lock ring 25 that has the inner edge thereof shaped as at 26 to enter the flared end 22 of the tubular member 11 whereby the tubular member 11 is rigidly and immovably retained in the housing 13.

The housing 13 is provided with a female coupling 260 which receives a male coupling 27 of a second cylindrical housing 28. The diameter of the housing 28 conforms to the diameter of the housing 13 so that the outer surfaces of both of the housings 13 and 28 forms a continuous unbroken outer surface for the apparatus 10.

Extending inwardly into the housing 28 from the outer end of the female coupling 26 and within the male coupling 27 is a circular cavity or chamber 29 and positioned within the confines of the female coupling 26 and contiguous with the inner surface thereof is a spacer and supporting disk 30. The disk 30 has an annular circumferential right angularly extending flange 31 that engages the inner wall surface of the cavity 29 and spaced inwardly from the flange 31 and spaced inwardly therefrom is an annular supporting ring-shaped rib 32, within the disk 30 centrally thereof and the rib 32 is an aperture 33 that is in alinement with the opening in the ring 25 and the passageway 12 in the tubular member 11.

Mounted within the flange 31 and engaged thereby and extending into the cavity 29 is a tubular liner 34 and mounted within the rib 32 and extending into the cavity 29 in spaced parallel relation to the liner 32 is a tubular supporting member 35 that is in alinement with the aperture 33, ring 25 and passageway 12 and the disk 30, liner 34 and supporting member 35 are made of a refractory material. Mounted on the supporting member 35 in circumjacent contactual relation therewith is a heating coil 36 and electrical leads 37 for the coil 36 extend outwardly of the housing 28 through an axial longitudinally extending bore 38 to be connected to a suitable source of electrical energy, not shown.

Extending from the cavity 29, through the housing 28 in angular spaced relation to each other and to the cavity 29 and in communication therewith are a pair of ducts 39 and 40. The outer end of the duct 39 within the housing 28 terminates in an internally threaded socket 41 into which is threaded a coupling 42 for connecting to the housing 28 a thermocouple of conventional design, not shown, whereby because of the communication available to the cavity 29 by means of the duct 39 the thermocouple may indicate any change of temperature that may occur in the cavity 29 by reason of the use of the heating coil 36, as well as exothermic and endothermic reactions occurring within the chamber 12 during use of the apparatus 10.

The outer end of the duct 40 within the housing 28 terminates in an internally threaded socket 43, into which is threaded a coupling 44 for connecting to the housing 28, a pressure supply line in which is interpolated a transducer of conventional design, not shown, whereby because of the communication available to the cavity 29 by means of the duct 40, the transducer may indicate and measure the pressure rises that may occur in the cavity 29 after pressure therein is first created by a conventional pressure supply system, not shown.

From the foregoing description it will be apparent that the apparatus 10 consists of a heated chamber and a cooled chamber and when a propellant ingredient is to be analyzed, the operation of the apparatus 10 is as follows:

A propellant ingredient 45 to be tested is placed in a skillet-shaped standard micro-combustion boat 46 which is inserted into the open end of the tubular member 11 and moved inwardly therein until it comes to rest within the chamber 15 where the propellant ingredient 45 may be cooled by the water A as it circulates through the chamber 15. A magnetic plug 47 is then inserted into the end of the tubular member 11 rearwardly of the micro-combustion boat 46.

A relief valve 48 is then coupled to the outer extreme end of the tubular member 11 and closed tight. Pressurized nitrogen or other suitable gas is then fed into the apparatus 10 by means of the duct 40 and by use of the transducer a predetermined pressure is obtained in the cavity 29 and passageway 12.

If, upon testing, the joint between the female coupling 260 and the male coupling 27, it is found that it is not leak proof, suitable gaskets may be used as found to be necessary. When complete sealing of the apparatus 10 has been achieved, the operation will continue. When the temperature desired has been indicated on the transducer, the heating coil 36 is activated and the gas in the apparatus 10 is heated.

It will be noted that all of the components of he apparatus 10 are made of a non-magnetic material, thus when a properly sized magnet is placed near the apparatus 10, its mgnetic force can be applied to the plug 47. Thus, by magnetic attraction the plug 47 can be caused to move, along the inner surface of the tubular member 11 within the passageway 12 pushing the micro-combustion boat 46 into the tubular supporting member 35, as shown in FIG. 2, where the propellant ingredient 45 may be affected by the heat produced by the heating coil 36.

The environment within the tubular supporting member 35 will radially heat the propellant ingredient 45 by means of radiant heat transfer and conduction of the gas with the apparatus 10, and decomposition and other gas producing reactions will be monitored by means of pressure rises as indicated by the transducer connected to the apparatus 10. As the pressure rises are being monitored by the transducer, the thermocouple, as has been previously stated, will be monitoring the positive and negative temperature rises occasioned by the use of the heating coil 36 and the exothermic or endothermic reactions that are occurring within the chamber 12 during the use of the apparatus 10.

If it is desired, the plug 47 may be moved back to the outer end of the tubular member 11 by use of the magnet to prevent heating the plug 47 by letting it remain within the tubular supporting member 35. After the analysis of the propellant ingredient has been conducted, the relief valve 48 may be opened and the duct 40 closed as to pressure entering the apparatus 10 and the pressure can be relieved from the apparatus 10. A pair of tongs can then be inserted into the tubular member 11 and the micro-combustion boat 46 may be removed from the apparatus 10.

The data collected from the apparatus 10 will consist of pressure and temperature rise and the rate of rise of each. Thus, the main objective of the analysis is obtained in that the operator is able to isolate pressure sensitive reactions over a range of temperatures and temperature sensitive reactions over a range of pressures.

It should also be apparent to one skilled in the art that the differential pressure analyzer is not restricted to testing propellant ingredients but may also be utilized to test any material that will undergo chemical changes when it is subjected to heat. Such chemical changes may be exothermic or endothermic and subject to modification by the use of pressure.

There has thus been provided a differential pressure analyzer that will test the response of propellant ingredients to heating and pressure and it is believed that from the foregoing description, the mode of operation and the assembly of the analyzer will be clear to one skilled in the art, it being also understood that variations in the mode of operation and assembly may be adhered to providing such variations conform to the spirit of the invention.

Having thus described the invention what is claimed as new and desired to be secured by Letters Patent is:

1. A differential pressure analyzer for use with propellant ingredients comprising a heating chamber and a cooling chamber positioned in coaxial alinement with each other, means for introducing a gas into said chambers, means for indicating pressure rises in said chambers, means for indicating temperature rises in said chambers, means for holding ap ropellant ingredient positioned in said cooling chamber, a movable magnetic plug positioned in said cooling chamber rearwardly of the means for holding a propellant ingredient and whereby under magnetic attraction said magnetic means will move said means for holding a propellant ingredient from said cooling chamber into said heating chamber.

2. A differential pressure analyzer as in claim 1 wherein a water jacket is utilized for cooling said cooling chamber.

3. A differential pressure analyzer as in claim 1 wherein a heating coil is utilized for heating sad heating chamber.

4. A differential pressure analyzer as in claim 1 wherein a circular housing is provided for each of said chambers and said housings are joined to each other by a male and a female joint.

References Cited

UNITED STATES PATENTS

| | | | |
|---|---|---|---|
| 2,795,132 | 6/1957 | Boehme et al. | 73—19 |
| 3,285,053 | 11/1966 | Mazieres | 73—15 |
| 3,314,282 | 4/1967 | Stiefel | 73—35 |

OTHER REFERENCES

Goodkin et al.: "Caloremtric Assembly For the Measurement of Heats of Fusion of Inorganic Compounds." in Revied of Scientific Instrument, vol. 29, #2 February 1968, pp. 105–108.

RICHARD C. QUEISSER, Primary Examiner

H. GOLDSTEIN, Assistant Examiner

U.S. Cl. X.R.

73—389